May 23, 1933. A. SCHWEPCKE 1,911,166
AUTOMATIC CONTROL FOR FIRE EXTINGUISHING APPARATUS
Filed July 2, 1929
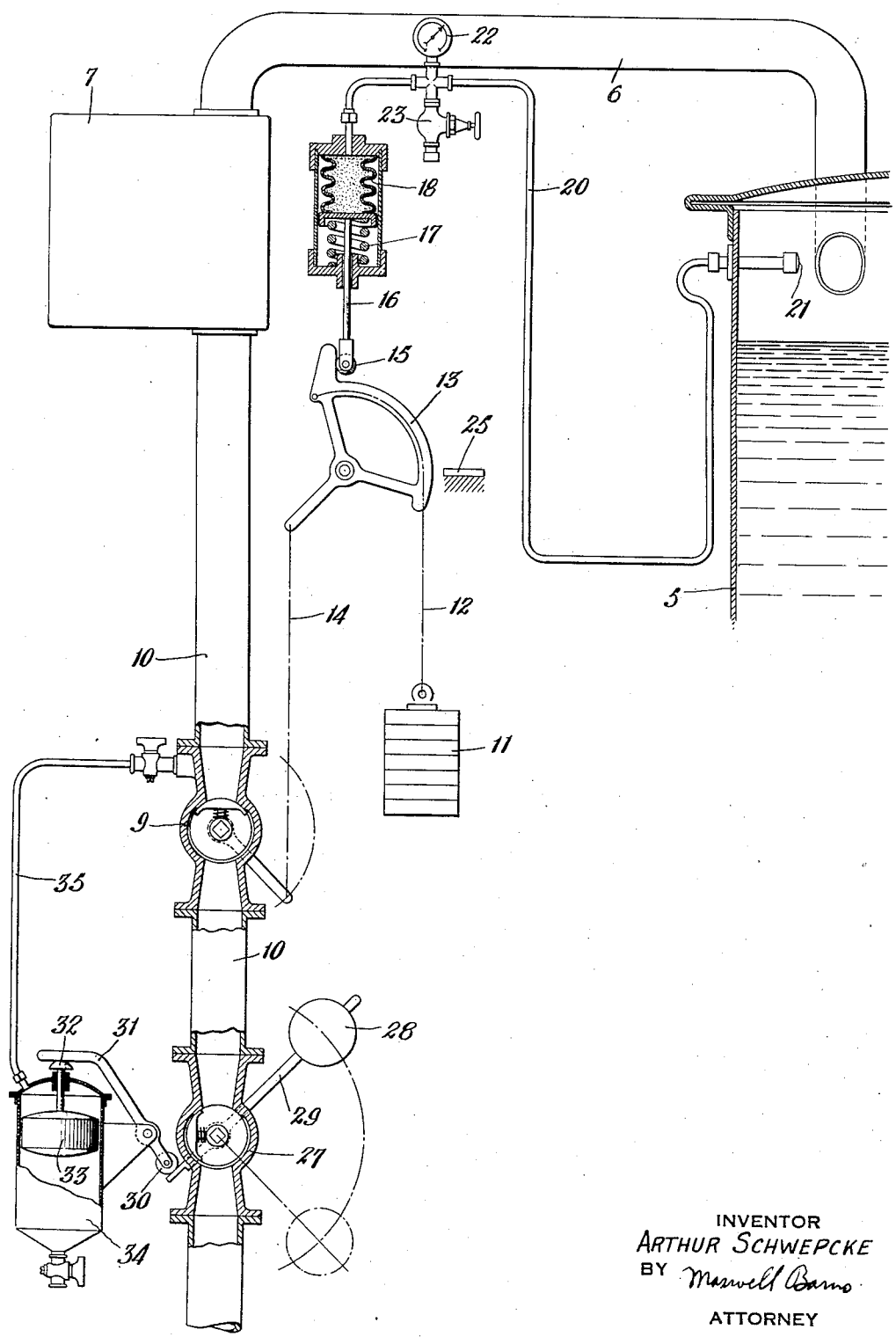
INVENTOR
ARTHUR SCHWEPCKE
BY Maxwell Barus
ATTORNEY Patented May 23, 1933

1,911,166

UNITED STATES PATENT OFFICE

ARTHUR SCHWEPCKE, OF NEURUPPIN, GERMANY, ASSIGNOR TO PYRENE-MINIMAX CORPORATION, A CORPORATION OF DELAWARE

AUTOMATIC CONTROL FOR FIRE EXTINGUISHING APPARATUS

Application filed July 9, 1929, Serial No. 375,541, and in Germany July 12, 1928.

The present invention relates to fire extinguishing apparatus and has for an object to provide an improved automatically operated apparatus adapted to supply fire extinguishing fluid for a predetermined limited period of time in the event of fire. The invention has been developed in connection with the design of an apparatus for supplying fire foam to an oil tank in the event of fire in said tank and for convenience of description such an apparatus will be described to illustrate the principles involved. It will be understood, however, that the particular description is illustrative merely and is not intended as defining the limits of the invention. The nature and objects of the invention will be better understood from a particular description of an illustrative apparatus for the purpose of which description reference should be had to the accompanying drawing forming a part hereof and in which—

The figure is a diagrammatic view of an apparatus constructed in accordance with the invention.

In the apparatus shown an oil tank 5 is arranged to be supplied with fire foam through a pipe 6 leading from a foam generator 7. The generation and flow of the foam is governed by controlling the flow of water in the pipe leading to the foam generator. Automatic heat controlled means is provided for opening a suitable valve to permit flow of water to the generator and therefore flow of foam to the oil tank, and an automatic timing means is arranged for closing a valve in the water supply pipe, which in the structure illustrated is a different valve. As shown, the valve 9 in the pipe 10 leading to the foam generator is ordinarily held in closed position but is arranged to be opened by a weight 11 connected by a chain, or the like, 12 to a segment lever 13 which through a chain 14 opens the valve when the lever is actuated by said weight. Ordinarily the lever 13 is held in inoperative position by a detent 15 carried on a piston rod 16 and urged upwardly by spring 17 against a collapsible container 18. A pipe 20 leads from said collapsible container to a point in the oil tank where fire is likely to occur and terminates in a fusible plug 21. The pipe and container are normally filled with a substantially incompressible fluid, such as glycerin, and upon fusion of the plug 21 said fluid escapes permitting collapse of the container 18 and retraction of the detent 15 by the spring 17. The pressure in the pipe 20 and container 18 is indicated by a pressure gauge 22. Fluid can be supplied to the pipe 20 and container 18 through a valve 23 provided for this purpose.

A stop 25 may be provided to limit the rotative movement of the segment lever 13, if desired.

The timing mechanism is constructed and arranged to shut off the flow of water a predetermined time after the opening of the valve 9. As shown, a separate valve 27 is provided in the pipe line 10 and this valve is tensioned to be closed by a weight 28 carried on the operating lever 29, which lever, however, is held against closing the valve by detent 30 carried on the lever 31 which is arranged to be moved to releasing position by a plunger 32 of a float 33 in a tank 34. Water is supplied in a small stream to the tank 34 through a pipe 35 leading from the water conduit 10 at a point beyond the valve 9. Accordingly, as soon as the valve 9 is opened water begins to flow into said tank and after a predetermined time the float 33 will rise to release the detent 30 and permit closing of the valve 27.

It will be understood that variations in the particular structure and arrangement may be made without departing from the spirit of the invention as described in the appended claims.

I claim:

1. In fire extinguishing apparatus, the combination with a conduit of a normally closed valve and means for opening said valve comprising a collapsible container, a pipe leading therefrom and terminating in a fusible plug, said container and pipe being filled with a substantially non-compressible fluid, weight operated means tensioned to open said valve, and a spring pressed detent normally held in detent engagement with said weight means against spring tension by said collapsible container, the spring being operable upon collapse of the container to retract said detent.

2. In fire extinguishing apparatus, the combination with a conduit, of a normally closed valve and means for opening said valve comprising a collapsible container, a pipe leading therefrom and terminating in a fusible plug, said container and pipe being filled with a substantially non-compressible fluid, weight operated means tensioned to open said valve and a spring pressed detent normally held in detent engagement with said weight means against spring tension by said collapsible container, the spring being operable upon collapse of the container to retract said detent, a normally open valve and a detent for holding said valve in open position, a timing device comprising a tank having a restricted water inlet connecting with the conduit beyond the normally closed valve, a float in said tank and means operated by said float for releasing said detent.

3. In apparatus of the class described a fluid conduit, a plurality of valves in said conduit one of said valves being normally open and the other normally closed, means for operating said normally closed valve to open the same and permit flow through said conduit, means for operating the normally open valve to close the same and thereby shut off flow through said conduit, detents normally preventing the operation of said operating means, heat responsive means for controlling the detent of the normally closed valve, and timing means for operating the other of said detents at a predetermined interval after the operation of the first detent.

4. Automatic fire extinguishing apparatus comprising a water line, a normally closed valve controlling the flow of water through said line, heat responsive means for controlling the opening of said valve, a second valve normally open for controlling the flow of water through said line, and timing means set into operation directly upon the opening of the first mentioned valve for controlling the closing of said second valve to shut off the flow of water through said line.

5. Automatic fire extinguishing apparatus comprising a water line, a normally closed valve controlling the flow of water through said line, heat responsive means for controlling the opening of said valve, a second valve normally open for controlling the flow of water through said line, a tank, means for diverting a small portion of the water passing through said valves into said tank, a float in said tank and connections from said float for controlling the closing of said second valve after a predetermined amount of water has been passed through said line.

6. In a fire extinguishing apparatus, the combination with a water conduit having valve operating means urging said valve into closed position, a normally open valve, and a detent for holding said valve operating means inoperative, of a timing device comprising a tank having a restricted water inlet communicating with said conduit and adapted to receive a small portion of the water passing through said conduit and diverted therefrom, a float in said tank, and means operated by said float for releasing said detent.

In testimony whereof, I have signed my name to this specification this 13th day of June, 1929.

ARTHUR SCHWEPCKE.